Patented Dec. 10, 1940

2,224,622

UNITED STATES PATENT OFFICE 2,224,622

INSECT REPELLENT

Frank A. Waples, deceased, late of Houston, Tex., by Cora R. Waples, executrix, Houston, Tex.

No Drawing. Application November 29, 1937, Serial No. 177,164

5 Claims. (Cl. 167—40)

The present invention relates to an insect repellent which is effective against flying insects such as mosquitoes in particular, midges, gnats, and the like and more particularly the invention relates to an insect repellent which is effective by burning a prepared substance and the consequent production of a vapor.

In compounding materials which are to be burned for the purpose of producing a vapor-like fume bearing light smoke which is effective as a mosquito repellent for example, it is necessary to consider use not only inside living premises but outdoor use as well. Further, there are the essential considerations of human health and comfort as the repellent must not be dangerous or uncomfortable to human beings within the sphere of its effective influence, even for extended periods of time.

It is therefore among the objects of the present invention to produce a substance which may be burned out of doors and at the same time give off a vapor or light smoke in the burning which will be effective as a mosquito or insect repellent. For such a use likewise it is an object of the present invention to provide such a composition of materials which will not go out in a breeze or burn too rapidly when blown.

It is also an object of this invention to provide a substance which may be employed without nuisance in the interior of dwelling houses, offices and other places of human habitation and which will not in the progress of burning smudge or soil or leave deposits on the walls, draperies or glass thereof.

A further object of the invention is to provide a substance which upon burning will produce an insect or mosquito repellent vapor which is pleasant in the realm of human experience and which does not hurt or irritate the eyes, nose, or throat of human beings.

It is also an object of the present invention to produce a composition of matter which upon combustion will have the characteristics above enumerated, among others, which can be readily ignited, burn slowly, and which may be readily snuffed out and reignited if not entirely consumed.

Further objects are to provide a combination of materials of maximum simplicity, economy, and ease of manufacture and such further objects, advantages, and capabilities as will later more fully appear and as are inherently possessed thereby.

The invention further resides in the combination of ingredients and manner of preparing the same illustrated herein and while there is described a preferred embodiment it is to be understood that the same is capable of modification and change and comprehends other details and changes without departing from the spirit or the scope of the invention.

For the purpose of producing an effective mosquito and insect repellent the procedure is as follows:

Vegetable fiber such as paper or wood pulp is placed in a suitable mixing device—a power cement mixer has been found advantageous for this purpose—and to this is added charcoal and resin. The charcoal added is pulverized to finely divided form and although any kind of charcoal is acceptable whether made from hard or soft woods, pine charcoal is preferable in that it does not tend to throw off sparks when burning. Thus the factor of safety is increased in the use of pine charcoal. The resin is preferably a natural resin which has previously been ground or reduced to finely divided form. All of the natural resins are acceptable for use in this composition. These ingredients are thoroughly mixed together until a substantially homogeneous mass is obtained. To this mass is added the requisite amount of tar. Preferably pine or wood tar is used as this tar contains well-known aromatic oils which are pleasing, although any tar may be used. Again the mass is thoroughly mixed to bring about as complete a dispersion of the tar as possible. While still in the mixer, enough water is added and mixed in to make the mass mold easily.

The wet mixture is then placed in molds preferably of truncated cone shape. A size which has been found commercially and practically desirable is roughly 3½" high, 2½" diameter at the base, and 1¾" in diameter at the top. However any suitable shape or size may be used dependent upon the length of time the package is intended to last and upon commercial considerations such as ease of handling, sales, and those of like import. The material is compressed in the mold to get rid of all the water possible to give the product a solid shape and form which will stand handling. After removing from the molds the tops of the product are brushed with a thin solution of flour paste containing a sufficient amount of pulverant natural resin to insure easy lighting. The product is then thoroughly but slowly dried as additional heat would melt the resin and the tar. When they are entirely dry they are ready for use or for wrapping and shipment.

A mold of the size hereinabove described will ordinarily produce the beneficial effects herein stated for a period of about two hours. However the length of burning for this size package— or any other size—may be regulated by increasing proportion of charcoal. By increasing the amount of charcoal the burning may be prolonged.

In the preferred practice of producing the insect repellent batches are formed substantially in accordance with the following ingredients and proportions:

| | | |
|---|---|---|
| Charcoal (pulverized form) | lbs | 2¼ to 2½ |
| Resin (pulverized form) | lbs | 2 to 2⅛ |
| Tar (liquid pine tar) | ozs | 7 to 8 |
| Vegetable fiber (in the form of paper or wood pulp) | lbs | 16 to 16½ |

Water sufficient to make the composition mold.

While the above proportions are those of the preferred embodiment it is to be understood that the amounts are not absolute but may be varied one way or the other within reasonable limits to secure precisely the same end characteristics of a mosquito or insect repellent emphasizing the characteristics of the particular ingredient present in increased proportions.

Instead of resin pine balsam may be used. The aromatic feature is particularly pleasant and refreshing when pine balsam is used.

To use the package of the present invention all that is necessary is to light the coated top surface with a match until a good flame is obtained and then to blow out the flame permitting the package to continue burning without an open flame until entirely consumed or intentionally extinguished. As a safety precaution the package should be set in a saucer or other shallow container while burning or may be carried from place to place in a tin cup. The burning package should be placed so that the vapor or light smoke will drift toward the person or persons to be protected. If intended for use at a lawn party or picnic it is perhaps best to use several of the packages placed at intervals so that the vapor will drift over the entire area. It is obvious that the package may be burned, for example, on a porch, in a boat, in a tent and is light enough in weight to take on outings in sufficient quantities without added burden.

When used in the house it may be placed in any convenient location and in the office it may even be placed under the desk. The vapor soon fills the entire room with a pleasant odor which is perfectly safe and which will not irritate the delicate tissues and membranes of the eyes, nose, and throat. It is perfectly safe to burn in the bedroom and one may go to sleep and leave it burning for the vapor so produced is not noxious.

All that is necessary to extinguish the package is to cover it with a can or jar and the combustion is soon smothered. After one use, if the package is not entirely consumed, it may be re-used and put out any number of times. In this way the package may be used at different times and until entirely consumed.

The product made in accordance with the present invention does not deteriorate with age or in storage. This has two great advantages; one, that the shop keeper may buy a large supply and if not all sold in that season they may be sold with confidence in the next season, second, likewise the householder may keep a supply on hand without danger or risk of loss from deterioration.

It is claimed:

1. A composition of matter which on being burned will give off a light smoke for driving off mosquitoes and the like comprising charcoal, resin, wood tar and vegetable pulp all mixed with sufficient water to mold under pressure into suitable shapes.

2. A composition of matter which on being burned will give off a light smoke for driving off mosquitoes and the like comprising charcoal, resin, wood tar and vegetable pulp all mixed with sufficient water to mold under pressure into suitable shapes, the molded package being coated on its top surface with a thin solution of flour paste and pulverized resin.

3. As a new article of commerce, a flying insect repellent comprising a mixture of charcoal, resin and tar thoroughly mixed with vegetable pulp and sufficient water to shape under pressure in molds which when dried will form a combustible package which burns without an open flame but smolders slowly emitting smoke or vapor inextinguishable by wind.

4. As a new article of commerce, an insect repellent which is safe for human health and comfort comprising a mixture of charcoal, resin and pine tar thoroughly mixed with vegetable pulp and sufficient water to shape under pressure in molds which when dried will form a combustible package which burns without an open flame giving off a light smoke for clearing the air of flying insects.

5. A composition of matter which on being burned will give off a light smoke for driving off mosquitoes and the like comprising 2¼ to 2½ lbs. of charcoal, 2 to 2⅛ lbs. of resin, 7 to 8 ozs. of wood tar, 16 to 16½ lbs. vegetable fiber and water enough to make the composition mold.

CORA R. WAPLES,
*Executrix of the Estate of Frank A. Waples, Deceased.*